US009131788B2

(12) United States Patent
Lindblom

(10) Patent No.: US 9,131,788 B2
(45) Date of Patent: Sep. 15, 2015

(54) PORTABLE FOLDING DISPLAY

(71) Applicant: Streater LLC, Albert Lea, MN (US)

(72) Inventor: Thomas G. Lindblom, Claremont, MN (US)

(73) Assignee: Streater LLC, Albert Lea, MN (US)

( * ) Notice: Subject to any disclaimer, the term of this patent is extended or adjusted under 35 U.S.C. 154(b) by 66 days.

(21) Appl. No.: 14/170,057

(22) Filed: Jan. 31, 2014

(65) Prior Publication Data

US 2015/0216330 A1 Aug. 6, 2015

(51) Int. Cl.
*A47F 5/10* (2006.01)
*A47F 3/00* (2006.01)

(52) U.S. Cl.
CPC ............... *A47F 5/105* (2013.01); *A47F 3/004* (2013.01); *A47F 5/10* (2013.01)

(58) Field of Classification Search
CPC ........ A47B 57/00; A47B 57/08; A47B 57/10; A47F 3/004; A47F 5/0846; A47F 5/10; A47F 5/101; A47F 5/105
USPC .......................................................... 211/199
See application file for complete search history.

(56) References Cited

U.S. PATENT DOCUMENTS

| | | | | |
|---|---|---|---|---|
| 3,463,218 A * | 8/1969 | Byrens et al. | ................. | 160/135 |
| 3,830,374 A * | 8/1974 | Kassimir | ............................ | 211/1 |
| 4,018,340 A * | 4/1977 | Gold | ............................... | 211/44 |
| 4,312,086 A * | 1/1982 | Bianco | ................. | 5/2.1 |
| 4,508,231 A * | 4/1985 | Honickman | ................. | 211/199 |
| 5,287,909 A * | 2/1994 | King et al. | ..................... | 160/135 |
| 5,431,761 A * | 7/1995 | Holztrager | .................... | 156/153 |
| 5,529,192 A * | 6/1996 | Conen et al. | .................. | 211/189 |
| 5,622,010 A * | 4/1997 | Weber | ............................ | 52/36.4 |
| 6,427,857 B1 * | 8/2002 | Adams et al. | .................. | 211/189 |
| 6,574,837 B2 * | 6/2003 | Jantschek | ....................... | 16/371 |
| 7,213,632 B1 * | 5/2007 | Goldstein et al. | ............. | 160/135 |
| 7,874,090 B2 * | 1/2011 | Flagg | .............................. | 40/605 |
| 8,807,356 B2 * | 8/2014 | Weigand et al. | ............. | 211/183 |
| 2008/0178543 A1 * | 7/2008 | Maas | ............................... | 52/234 |
| 2009/0255638 A1 * | 10/2009 | Hardt, II | ....................... | 160/351 |
| 2011/0099921 A1 * | 5/2011 | Fitzgerald et al. | ........... | 52/127.1 |
| 2012/0241401 A1 * | 9/2012 | Galey | ........................... | 211/189 |
| 2013/0260362 A1 * | 10/2013 | Melashenko et al. | ......... | 434/430 |

FOREIGN PATENT DOCUMENTS

FR 2784134 A1 * 4/2000

* cited by examiner

*Primary Examiner* — Joshua Rodden
(74) *Attorney, Agent, or Firm* — Nikolai & Mersereau, P.A.; Thomas J. Nikolai

(57) ABSTRACT

A portable foldable display includes a pair of end sections and a plurality of intermediate sections. The intermediate sections are joined together in a manner which permits the intermediate sections to be rotated with respect to each other for folding and unfolding of the display. The display also includes a plurality of shelves which may extend from the front or back of any of the intermediate sections and outwardly from the end sections. The vertical spacing between the shelves is adjustable. The display is on wheels to permit easy transport.

18 Claims, 5 Drawing Sheets

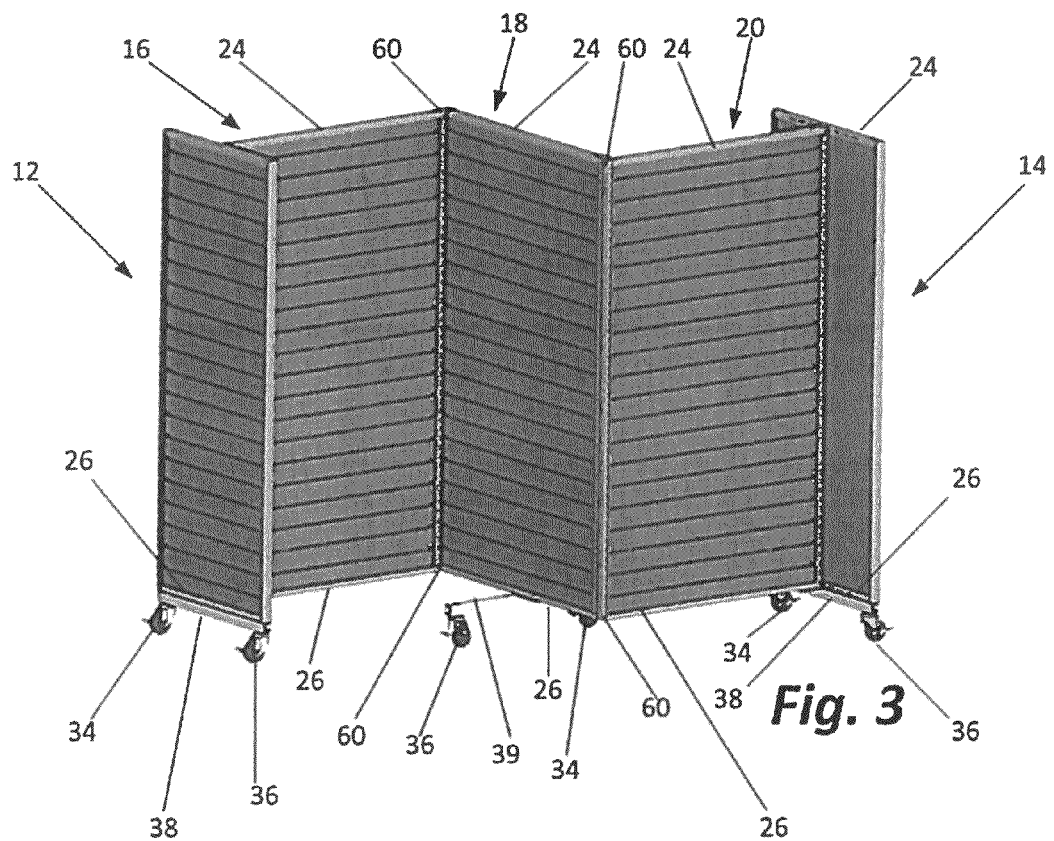
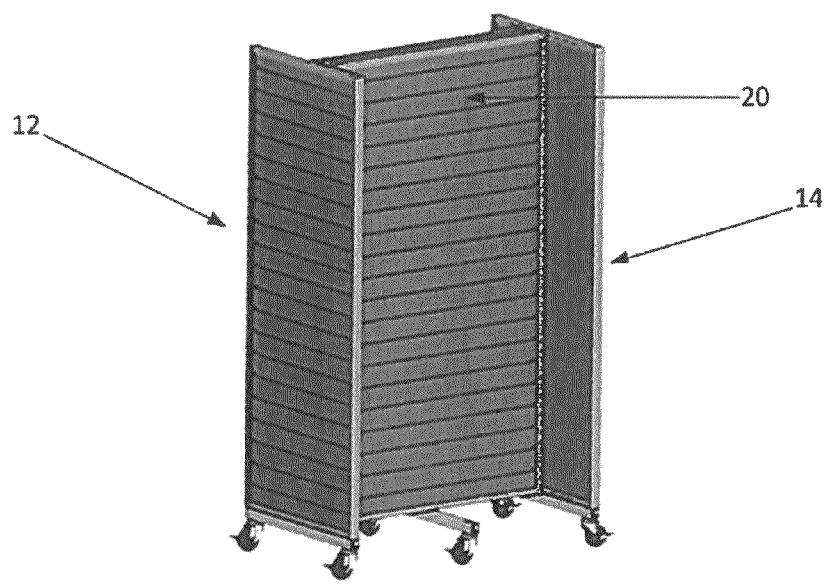
Fig. 3
Fig. 4

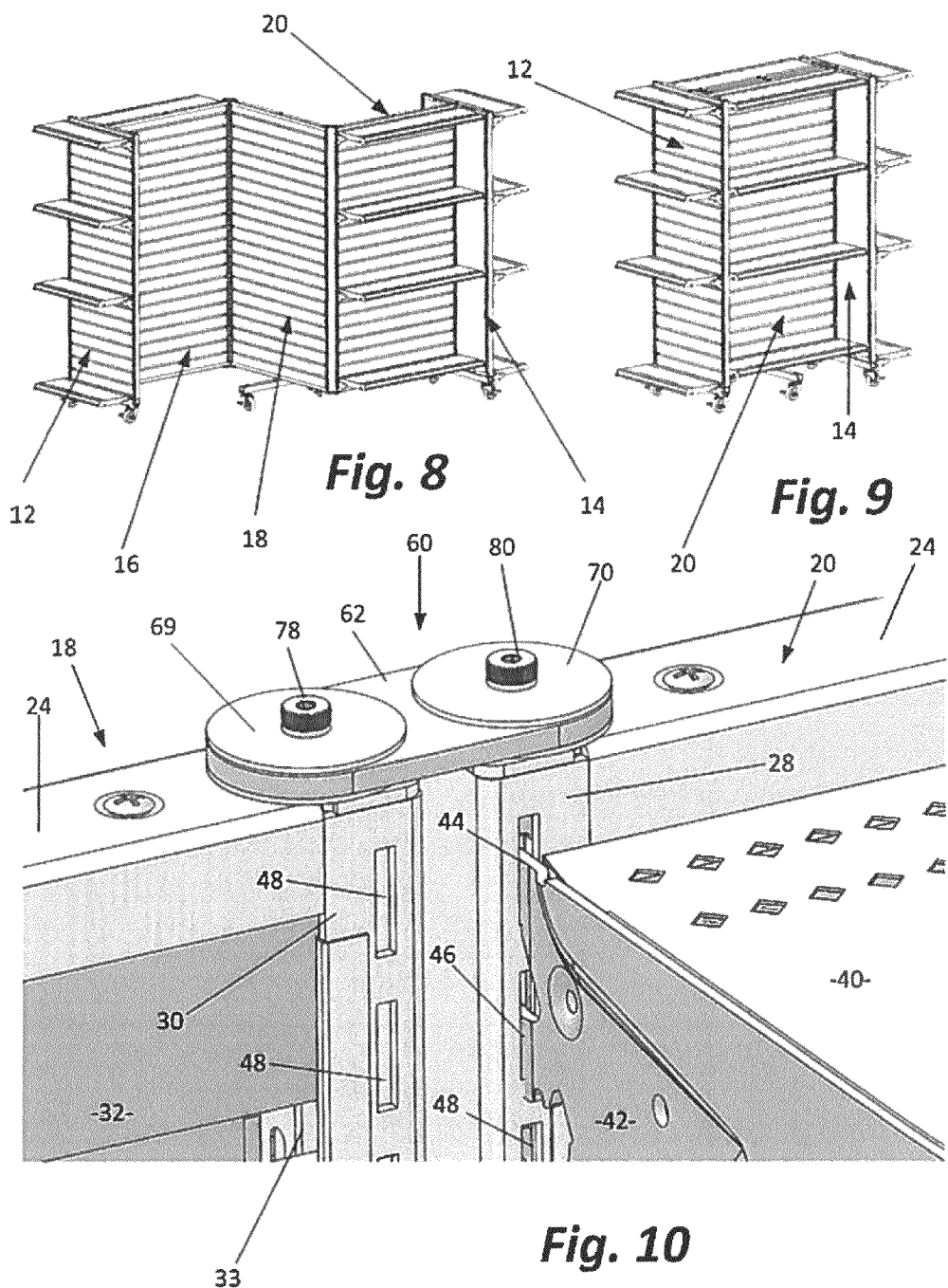

PORTABLE FOLDING DISPLAY

CROSS-REFERENCED TO RELATED APPLICATIONS

Not applicable

STATEMENT REGARDING FEDERALLY SPONSORED RESEARCH OR DEVELOPMENT

Not applicable

BACKGROUND OF THE INVENTION

I. Field of the Invention

The present invention relates to gondola-type shelving often used to display items in retail locations. More specifically, the present invention relates to a portable folding display.

II. Related Art

Gondola-type shelving is used in retail stores throughout the world. Significant advantages of gondola-type shelving are that such shelving is durable, sturdy, relatively easy to assemble, and readily permits the vertical distance between the actual shelves to be adjusted. Most gondola-type shelving is, however, designed to be stationary rather than portable. Also, gondola-type shelving is typically designed to incorporate straight lines and right angles. This works well in a rectangular room or a rectangularly-shaped display area, but limits the aesthetic offerings available. Likewise, most gondola-style shelving units must be completely (or at least mostly) disassembled for storage or for moving a unit to a different location.

SUMMARY OF THE INVENTION

The present invention addresses the limitations of prior art gondola-type shelving systems by providing a portable folding display. The portable folding display further serves to support a plurality of shelves on either the front or back of the display or on both the front and back of the display as well as on the ends of the display.

More specifically, the portable folding display comprises first and second end sections and one or more intermediate sections. Each of the sections includes a frame comprising a top member, a bottom member and a pair of hollow vertical posts defined by a front wall, a back wall and opposing end walls. Each vertical post, like the support posts of a standard gondola shelving system, has a plurality of vertically arranged slots through a front wall and a back wall. The interior of the frame of each of the sections may be filled with a panel or left open as desired.

During assembly, a first of the intermediate sections is non-rotatably affixed to the first end section such that the first intermediate section extends perpendicularly from the first end section. A second intermediate section is affixed in this same fashion to the second end section. One or more additional intermediate sections are then placed between the first and second intermediate sections such that the sections are in end-to-end alignment. Top and bottom hinge assemblies are employed to couple each adjacent pair of intermediate sections together.

Wheel assemblies may also be provided. Each wheel assembly includes a bar and a pair of caster wheels coupled to the bottom of the bar. Each end section is provided with one of the wheel assemblies extending downwardly from the bottom member of the frame. To maximize stability, the caster wheel extends downwardly from the opposite ends of the bar and the top of the bar is arranged parallel to and in face-to-face registration with the underside of the bottom frame member of the associated end section. A third wheel assembly may be coupled to the bottom member of the frame of one of the intermediate sections so as to extend perpendicularly forward and rearward of the bottom frame member. Some or all of the caster wheels are preferably lockable.

This arrangement of the sections, the wheels and the hinges provides a display which is foldable and portable. The slots through the front and back walls of the vertical posts of a section's frame permit standard gondola-type shelves to be vertically arranged and mounted to the front and/or back of each intermediate section and to at least the outside of each of the end sections.

The present invention permits the entire assembly to be easily moved from place to place. The present invention permits the display to be folded for storage even with some of the shelves still in place. The present invention also allows the display to be arranged in a number of different aesthetically pleasing display configurations in addition to the intermediate panels extending along a straight line with the end panels extending perpendicularly to that line.

BRIEF DESCRIPTION OF THE DRAWINGS

The foregoing features, objects and advantages of the invention will become apparent to those skilled in the art from the following detailed description and with reference to the following drawings in which like numerals and the several views refer to corresponding parts.

FIG. 3 is a perspective view of the display assembly of FIG. 1 arranged so the intermediate sections are each at a right angle with respect to any adjacent intermediate section.

FIG. 4 is a perspective view of the display assembly of FIG. 1 in its folded configuration.

FIGS. 8-9 are perspective views showing only some of the shelves removed to permit the display assembly to be placed in the folded configuration.

FIG. 10 is a partial perspective view showing one of the hinges used to join the adjacent intermediate sections together.

DETAILED DESCRIPTION

Figure 1:
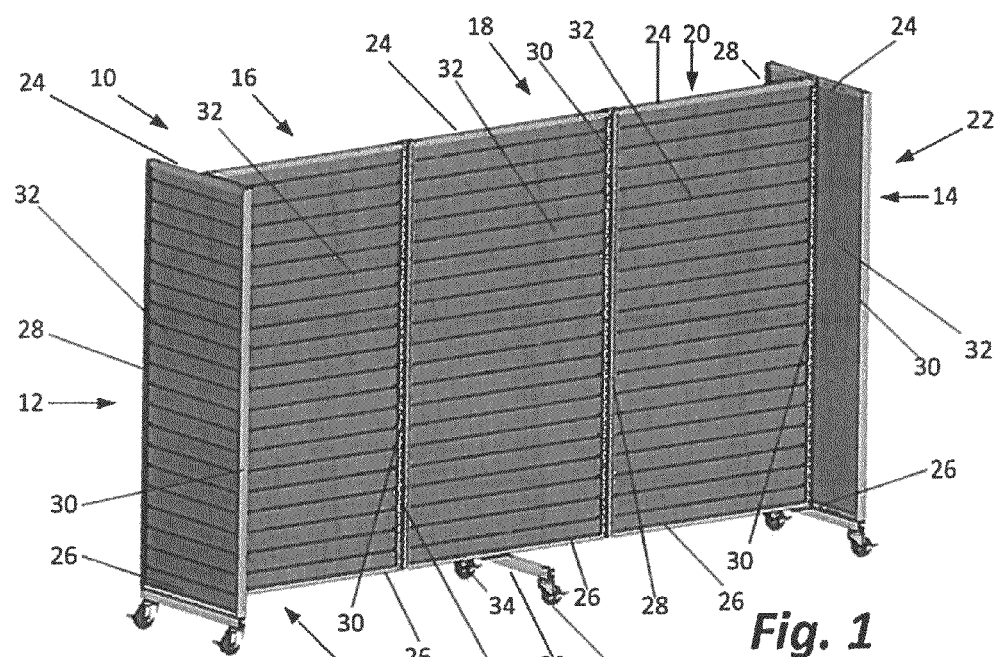
FIG. 1 is a perspective view of a display assembly in a straight configuration.
Figure 2:
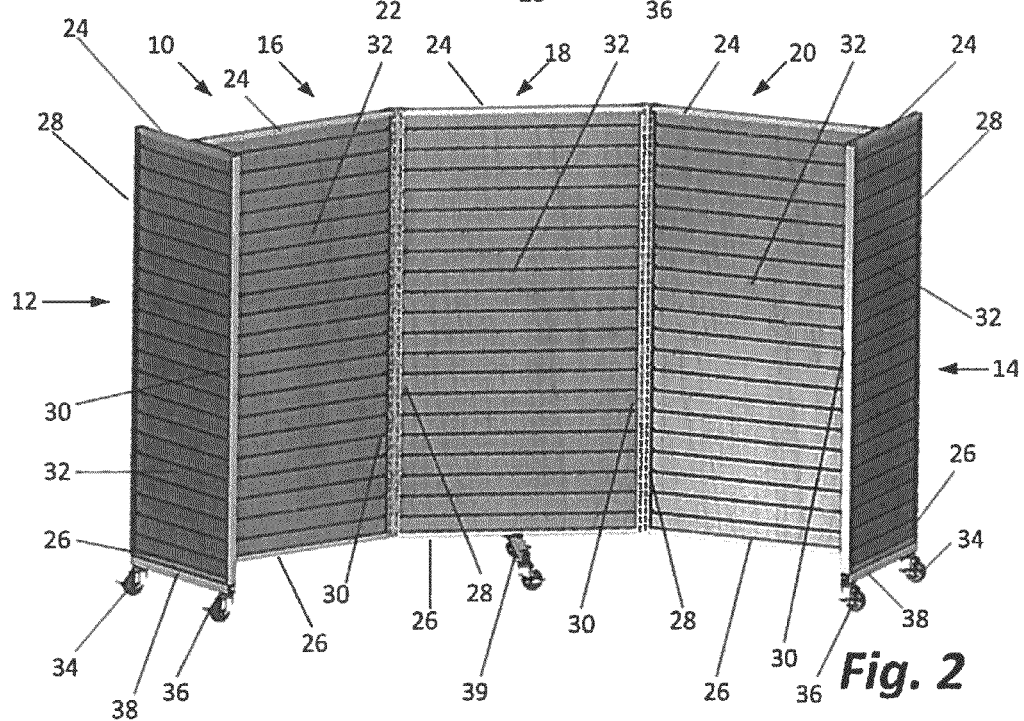
FIG. 2 is a perspective view of the display assembly of FIG. 1 arranged so the intermediate sections of the display assembly are at an angle with respect to each other different than 180°.

This description of the preferred embodiment is intended to be read in connection with the accompanying drawings, which are to be considered part of the entire written description of this invention. In the description, relative terms such as "lower", "upper", "horizontal", "vertical", "above", "below", "up", "down", "top" and "bottom", "under", as well as derivative thereof (e.g., "horizontally", "downwardly", "upwardly", "underside", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "joined", and "joining" are used interchangeably and refer to one structure or surface being secured to another structure or surface or integrally fabricated in one piece unless expressly described otherwise.

The display assembly 10 of a gondola-type shelving system is shown in FIGS. 1-4. The display assembly comprises end sections 12 and 14. Three intermediate sections 16, 18 and 20 are also shown. Each section has an outer frame 22 comprising a top member 24, a bottom member 26, and first and second vertical posts 28 and 30. The outer frame 22 of each section defines a rectangular opening that may be filled with a panel 32. The panel 32 may be in the form of a sheet of plywood, corkboard, pegboard or a decorative board. The panel 32 may be constructed of a single piece or a plurality of horizontally arranged pieces (as shown) or vertical pieces. In any event, the frame members are provided with channels 33 (see FIG. 10) to receive the edges of the panel such that the panel 32 is fixed to the frame 22. FIGS. 1-4 show the fronts of the intermediate panels. The backs of the intermediate panels are the mirror image thereof.

Mounted to the bottom member 26 of each of the two end sections 12 and 14 is a wheel assembly. Each wheel assembly includes a pair of castered, lockable wheel 34 and 36 which are coupled to the bottom of the opposite ends of a tubular bar 38 of rectangular cross-section. The top surface of bar 38, in turn, is coupled to the bottom surface of member 26. With respect to the end sections, the bar 38 is adapted to extend in a direction parallel to and is in face-to-face registration with the undersurface of bottom member 26. Examples of caster wheels suitable for use include stem casters and flush-mounted casters generally known in the art. Each caster may also be provided with a brake to selectively prevent rotation of the wheel.

Mounted to the center of the bottom frame member 26 of intermediate section 18 is another wheel assembly comprising a bar 39. This bar 39 is substantially the same as the bars 38 except it is adapted to extend perpendicularly from the underside of bottom frame member 26 in front of and in back of the intermediate section 18. Mounted to the bottom of bar 39 is another pair of castered, lockable wheels 34 and 36. The wheels 34 and 36 are mounted at opposite ends of the bars 38 and 39 to ensure stability of the display assembly. The locks on the wheels permit the display assembly to be selectively locked in place. By unlocking the wheels, the display assembly may be moved or folded or the angles between adjacent intermediate sections 16-20 adjusted.

Figure 5:
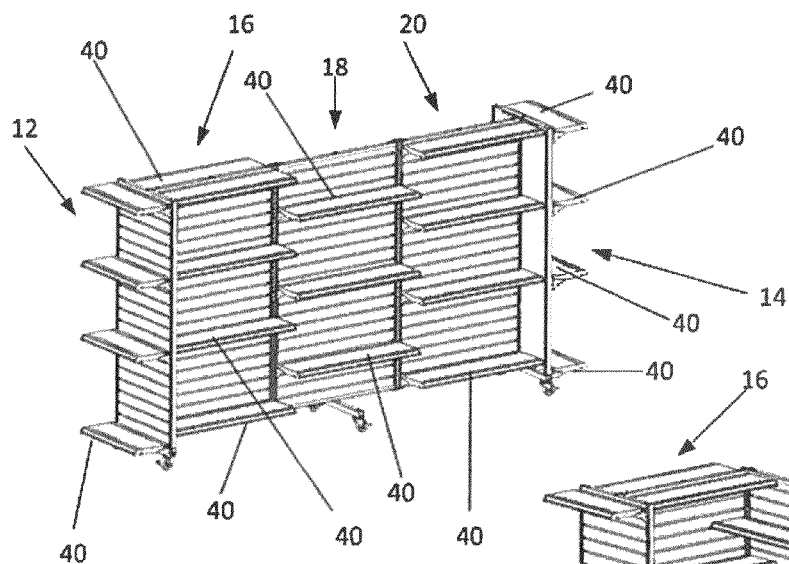
FIGS. 5-7 are perspective views of various configurations of the display assembly of FIG. 1 with shelves attached to the end panels and the intermediate panels.
Figure 6:
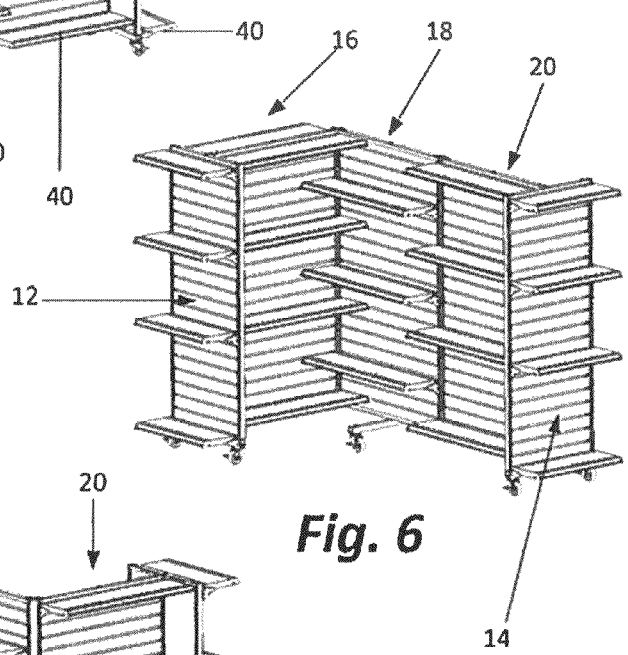
Figure 7:
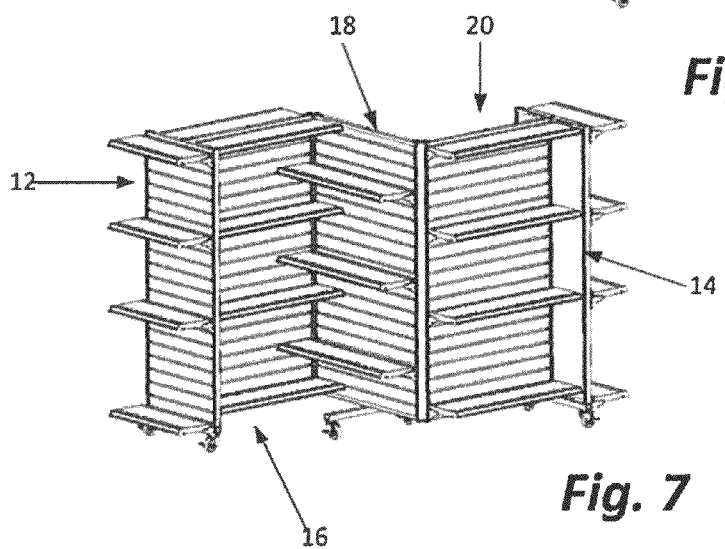

Each section of the display assembly shown in FIGS. 1-4 is designed to support one or more shelves 40 which may be adjustably and vertically spaced along the height of each section 12-20 as shown in FIGS. 5-7. Shelves 40 may be mounted to, and project outwardly from, the end sections 12 and 14. Shelves 40 may also be mounted to and extend outward from the front and back of the intermediate sections 16, 18 and 20. The shelves 40 are standard gondola-type shelves which have brackets 42 at each end of the shelves. Each bracket has at least a pair of hooks 44 and 46 which mate with vertically spaced slots 48 in the front and back walls of each of the hollow vertical posts 28 and 30. See FIG. 10. As shown in FIGS. 5-7, a shelf 40 has a length sufficient to span the section such that a bracket 42, on one end of the gondola shelf 40, mates with slots 48 in post 28 and the bracket 42 on the opposite end of shelf 40 mates with slots 48 in post 30.

As illustrated in FIGS. 8 and 9, only some of the shelves 40 must be removed to permit folding of the display assembly. Specifically, the shelves need only be removed from the front of panel 16, the front and back of panel 18 and the back of panel 20 to permit folding of the display assembly as in FIG. 9.

Figure 11:
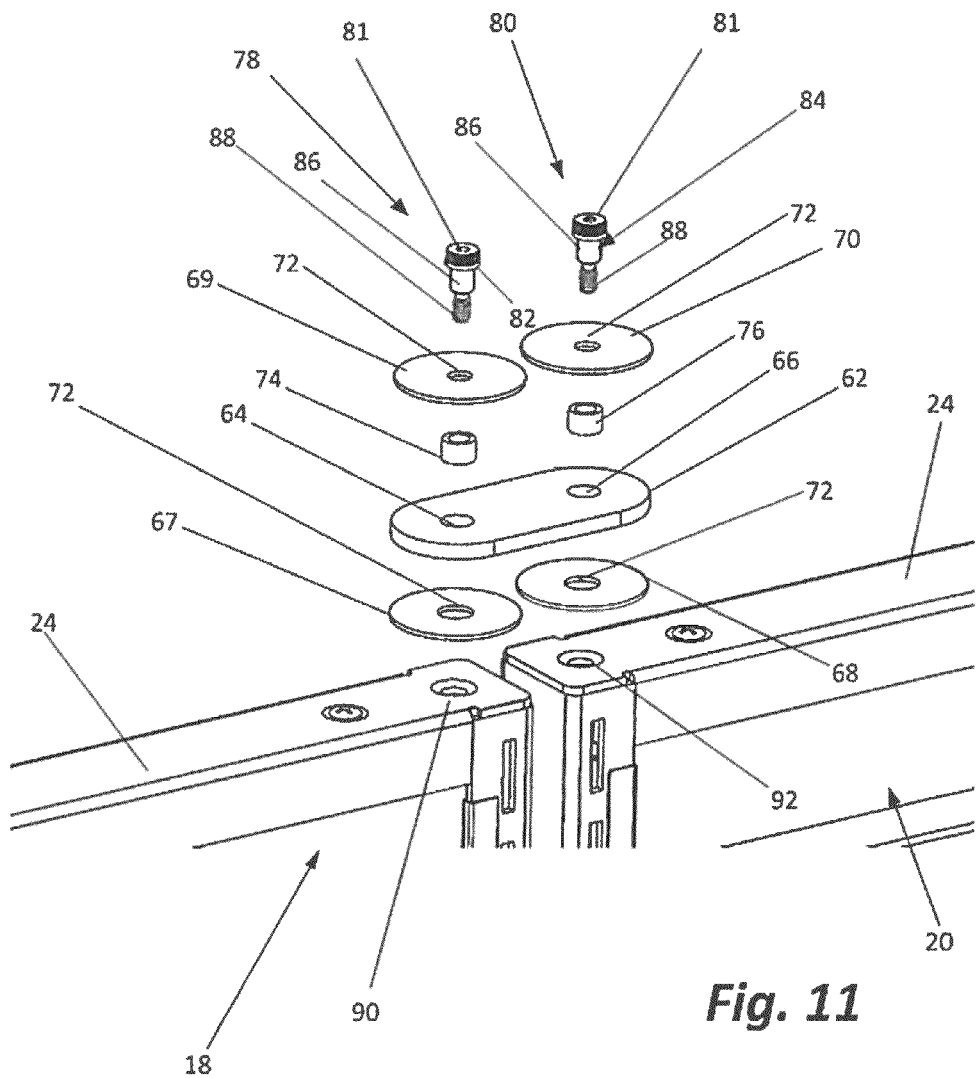
FIG. 11 is an exploded view of the hinge shown in FIG. 10.

Hinges 60 in FIG. 10 are used to couple the adjacent intermediate panels 16, 18 and 20 together so they may pivot with respect to each other as illustrated in FIGS. 10 and 11. A separate hinge 60 is located at (and connects) the tops and the bottoms of adjacent panels. More specifically, a top hinge 60 and a bottom hinge of the same construction couple panel 16 to panel 18. Two such hinges 60 also couple panels 18 and 20 together.

As seen in FIG. 11, each hinge 60 comprises a spacer plate 62 having a pair of holes 64 and 66 therethrough. Each hinge also includes four washers 67, 68, 69 and 70 each having a center hole 72 therethrough. Each hinge includes two cylindrical bushings 74 and 76. Each hinge also includes two shoulder bolts 78 and 80. Each of bolts 78 and 80 includes a head 81 above a flange 82. Extending below the flange 82 is a shoulder 84 having a wider non-threaded section 86 followed by a narrower threaded section 88.

A hinge 60 is coupled to two adjacent sections by aligning the disks, plates, and bushings over a threaded hole 90 in the top member and bottom members of the frame of one of the intermediate sections (e.g., 18) and a threaded hole 92 in the top member and bottom members of the frame of an adjacent section (e.g., 20). Specifically, hole 72 of washer 67 is aligned with threaded hole 90 and hole 72 of washer 68 is aligned with threaded hole 92. Next, the plate 62 is positioned so hole 64 is aligned with hole 90 and hole 66 is aligned with hole 92. The bushings 74 and 76 are then placed within holes 64 and 66, respectively. Next, hole 72 in washer 69 is aligned with hole 90 and hole 72 in washer 70 is aligned with hole 92. Finally, the threaded section 88 of bolt 78 is passed through disk 69, the plate 62 and disk 67 and then into hole 90. Likewise, the threaded section 88 of bolt 80 is passed through disk 70, plate 62, disk 68 and into hole 92. Rotation of the bolts 78 and 80 causes the bolt threads to mesh with the internal threads of any holes 90 and 92 respectively to couple the hinge 60 to the two sections (e.g., 16 and 18) and likewise couple the two sections together.

The dimensions of the spacer plate 62 permit the adjacent sections coupled by (and more specifically the distance between the holes through the spacer plate) a pair of hinges 60 to rotate nearly 360° with respect to each other about the top and bottom hinges 60 used to couple the sections together. The arrangement of the bushings 74 and 76 in the plate holes 64 and 66 and the unthreaded shoulder portions of the bolts 78 and 80 permit such rotation while maintaining a solid connection between the two adjacent sections.

Again, each pair of adjacent intermediate sections is coupled together by a pair of hinges 60. The connection between the end panels 12 and 14 and the adjacent intermediate panels 16 and 18 respectively is fixed.

From the foregoing and the accompanying drawings, one skilled in the art should recognize that the display offers a variety of advantages. First, it sits in a stable fashion on the wheels of the wheel assemblies. Second, it can be manipulated into a variety of display configurations such as, for example, the configurations shown separately in FIGS. 1-4 and 6. Also, when the display is configured as shown in FIGS. 4 and 9, the display is compact and can easily be stored or transported from one site to another in this configuration. As also should be clear from the drawings, the various shelves 40 may extend outwardly from either of the two end sections or from the front and back of any of the intermediate sections. Further, only some of the shelves need be removed to prevent folding from, for example, the configuration shown in FIG. 5 to the configuration shown in FIG. 9. FIG. 8 shows an intermediate step with the necessary shelves removed. The vertical spacing between the shelves can be adjusted to accommodate different types of merchandise or to permit an intermediate section to be turned at a right angle to another intermediate section as sections 16 and 18 are shown, for example, in FIGS. 6 and 7. As shown in the drawings, all of the wheels are provided with a lock of the type typically used on a standard caster wheel. By locking the wheels, the display may be held in a specific configuration or position. All one needs to do to adjust the configuration or move the display is unlock some or all of the wheels. The hinge arrangement illustrated in FIG. 10 permits complete rotation of the intermediate sections relative to each other such that, for example, the fronts of sections 16 and 18 may be placed in parallel, face-to-face registration with each other or rotated approximately 360° such that the backs of sections 16 and 18 are in parallel, face-to-face registration with respect to each other.

One skilled in the art should also recognize that various modifications may be made from what is disclosed without deviating from the invention. For example, the bracket used on the shelves may include three hooks rather than two as is commonly the case with gondola-type shelving. Also, rather than providing a threaded hole 90 or 92, the hole may have a smooth interior wall in which case the threaded section 88 of the bolts 78 and 80 will simply be coupled to a nut, and perhaps a lock washer, located beneath the top member 24 of the associated frame. What is important is that a pair of hinges used to couple two sections together do so in a secure manner, permit rotation of the two sections relative to each other and provide a spacing between the two sections sufficient to permit such rotation to occur.

The foregoing description is intended to explain the various features and advantages, but is not intended to be limiting. The scope of the invention is defined by the following claims which are also intended to cover a reasonable range of equivalents.

What is claimed is:

1. A portable foldable display assembly comprising:
    (a) first and second end sections each having an outside surface and an inside surface surrounded by a frame comprising a top member, a bottom member and a pair of hollow vertical posts having an outside wall and a plurality of vertically arranged slots through the outside wall;
    (b) first, second and third intermediate sections, each having a front and a back and each including a frame comprising a top member, a bottom member and a pair of hollow vertical posts having front and back walls and a plurality of vertically arranged slots through the front and back walls, wherein one end of said first intermediate section is adapted to be coupled to the first end section so that the first intermediate section extends perpendicularly from the inside of the first end section and the third intermediate section is adapted to be coupled to the second end section so that the third intermediate section extends perpendicularly from the inside of the second end section;
    (c) a first pair of top and bottom hinge assemblies for pivotally coupling the top and bottom members of the second intermediate section to the top and bottom members of the first intermediate section such that the first pair of top and bottom hinge assemblies are further adapted to permit the first intermediate section to be rotated relative the second intermediate section between a first position in which the back of the first intermediate section is parallel to and in face-to-face registration with the back of the second intermediate section and a second position in which the front of the first intermediate section is parallel to and in face-to-face registration with the front of the second intermediate section;
    (d) a second pair of top and bottom hinge assemblies for pivotally coupling the top and bottom members of the second intermediate section to the top and bottom members of the third intermediate section such that the second pair of top and bottom hinge assemblies are further adapted to permit the third intermediate section to be rotated relative the second intermediate section between a first position in which the back of the third intermediate section is parallel to and in face-to-face registration with the back of the second intermediate section and a second position in which the front of the third intermediate section is parallel to and in face-to-face registration with the front of the second intermediate section; and wherein the hinge assemblies comprise (i) a spacer plate having first and second spaced apart holes formed therethrough, (ii) a plurality of washers, and (iii) a pair of shoulder bolts, a shoulder portion of each being sized to fit through the first and second holes formed through the spacer plate and through washers placed on opposite sides of the spacer plate and a threaded portion of the shoulder bolts adapted to screw into a threaded bore formed in the top and bottom frame members of adjacent ones of the first, second and third intermediate members.

2. The portable foldable display assembly of claim 1 and further including at least three wheel assemblies, each wheel assembly including a bar having a top surface and bottom surface with a pair of caster wheels coupled to the bottom surface of the bar proximate opposite ends of the bar, a first of the wheel assemblies adapted to be coupled to the bottom member of the frame of the first end section so that the top surface of the bar of the first of the wheel assemblies is in face-to-face registration with the bottom member of the frame of the first end section and extends parallel to the bottom member of the frame of the first end section, a second of the wheel assemblies adapted to be coupled to the bottom member of the frame of the second end section so that the top surface of the bar of the second of the wheel assemblies is in face-to-face registration with the bottom member of the frame of the second end section and extends parallel to the bottom member of the frame of the second end section, and a third of the wheel assemblies adapted to be coupled to the bottom member of the frame of the second intermediate section so that the bar of the third of the wheel assemblies extends forward and backward from the bottom member of the frame of the second intermediate section in a direction perpendicular to the bottom member of the frame of the second intermediate section.

3. The portable foldable display of claim 2 wherein at least some of the caster wheels are lockable.

4. The portable foldable display assembly of claim 1 further comprising a plurality of shelves adapted to be couple to the vertical support posts of at least one of the end sections and extend outwardly from the outside of said at least one of the end sections.

5. The portable foldable display assembly of claim 4 wherein each of said shelves include a bracket comprising first and second hooks adapted to mate with the vertically arranged slots of one of the hollow vertical posts of said at least one of the end sections.

6. The portable foldable display assembly of claim 1 further comprising a plurality of shelves, each adapted to be couple to the vertical support posts of at least one of the intermediate sections and extend outwardly from the front or back of said at least one of the intermediate sections.

7. The portable foldable display assembly of claim 6 wherein each of said shelves include a bracket comprising first and second hooks adapted to mate with the vertically arranged slots of one of the hollow vertical posts of said at least one of the intermediate sections.

8. The portable foldable display assembly of claim 1 wherein hinge assemblies further comprises first and second bushings, wherein the first bushing resides in the first hole of the spacer plate and the second bushing resides in the second hole of the spacer plate.

9. The portable foldable display of claim 1 wherein said hinge assemblies are adapted to permit the display to be folded so that the front of the first intermediate section is in face-to-face registration and parallel to the front of the second intermediate section and the back of the third intermediate section is in face-to face registration with and parallel to the back of the second intermediate section.

10. The portable fordable display of claim 1 wherein at least one of the intermediate sections further comprises a rectangular panel having at least one edge.

11. The portable foldable display of claim 10 wherein the frame of said at least one of the intermediate sections includes a channel for receiving at least one edge of the panel.

12. A portable foldable display assembly comprising:
(a) at least three rectangular intermediate sections, each having a front and a back and extending from a first vertical end edge to a second vertical end edge, each of the three intermediate sections including a frame comprising a top member, a bottom member and a pair of hollow vertical posts having front and back walls with a plurality of vertically arranged slots formed through the front and back walls, said at least three intermediate sections arranged end to end from a first intermediate section to a last intermediate section;
(b) a first end section having an outside and an inside and a frame comprising a top member, a bottom member and a pair of hollow vertical posts having an outside wall and a plurality of vertically arranged slots through the outside wall, said first end section adapted to be coupled to the first vertical end edge of the first of the at least three intermediate sections such that the first end section is perpendicular to the first intermediate section and extends beyond the front and back of the first intermediate section;
(c) a second end section having an outside and an inside and a frame comprising a top member, a bottom member and a pair of hollow vertical posts having an outside wall and a plurality of vertically arranged slots through the outside wall, said second end section adapted to be coupled to the second vertical end edge of the last of the at least three intermediate sections such that the second end section is perpendicular to the last intermediate section and extends beyond the front and back of the last intermediate section;
(d) a first pair of top and bottom hinge assemblies for pivotally coupling the second vertical end edge of one of the at least three intermediate sections to the first vertical end edge of another of the at least three intermediate sections, each hinge assembly of the first pair of top and bottom hinge assemblies comprising a spacer plate having first and second holes through the spacer plate, first, second, third and fourth disk washers each having a hole therethrough, and a pair of shoulder bolts each having a head and a shoulder portion, wherein the shoulder portion of one of the bolts is adapted to pass through the hole of the first disk washer, the first hole of the spacer plate and the hole of the second disk washer and couple the hinge assembly to the second vertical end portion of said one of the at least three intermediate sections and the shoulder portion of the other of the bolts is adapted to pass through the hole of the third disk washer, the second hole of the spacer plate and the hole of the fourth disk washer and couple the hinge assembly to the first vertical end portion of said another of the at least three intermediate sections, and wherein the hinge assemblies of the first pair of top and bottom hinge assemblies are further adapted to permit said one of the at least three intermediate sections to be rotated relative said another of the at least three intermediate sections between a first position in which the back of said one of the at least three intermediate sections is parallel to and in face-to-face registration with the back of said another of the at least three intermediate sections and a second position in which the front of said one of the at least three intermediate sections is parallel to and in face-to-face registration with the front of said another of the at least three intermediate sections;
(e) at least three wheel assemblies, each wheel assembly including a bar having a top surface and bottom surface and a pair of caster wheels coupled to the bottom surface of the bar proximate opposite ends of the bar, a first of the wheel assemblies adapted to be coupled to the bottom member of the frame of the first end section so that the top surface of the bar of the first of the wheel assemblies is in face-to-face registration with the bottom member of the frame of the first end section and extends parallel to the bottom member of the frame of the first end section, a second of the wheel assemblies adapted to be coupled to the bottom member of the frame of the second end section so that the top surface of the bar of the first of the wheel assemblies is in face-to-face registration with the bottom member of the frame of the second end section and extends parallel to the bottom member of the frame of the second end section, and a third of the wheel assemblies adapted to be coupled to the bottom member of the frame of any one of the intermediate sections so that the bar of the third of the wheel assemblies extends forward and backward from the bottom member of said any one of the intermediate sections in a direction perpendicular to the bottom member of the frame of said any one of the intermediate sections.

13. The portable foldable display assembly of claim 12 further comprising a plurality of shelves adapted to be couple to the vertical support posts of at least one of the end sections and extend outwardly from said at least one of the end sections.

14. The portable foldable display assembly of claim 13 wherein each of said shelves include a bracket comprising first and second hooks adapted to mate with the vertically arranged slots of one of the hollow vertical posts of said at least one of the end sections.

15. The portable foldable display assembly of claim 12 further comprising a plurality of shelves, each adapted to be couple to the vertical support posts of at least one of the intermediate sections and extend outwardly from the front or back of said at least one of the intermediate sections.

16. The portable foldable display assembly of claim 15 wherein each of said shelves include a bracket comprising first and second hooks adapted to mate with the vertically arranged slots of one of the hollow vertical posts of said at least one of the intermediate sections.

17. The portable foldable display assembly of claim 12 wherein each the top and bottom hinge assemblies further comprises first and second bushings, wherein the first bushing resides in the first hole of the spacer plate and the second bushing resides in the second hole of the spacer plate.

18. The portable foldable display of claim 12 wherein at least some of the caster wheels are lockable.

\* \* \* \* \*